(12) United States Patent
Pittmann

(10) Patent No.: US 8,605,680 B2
(45) Date of Patent: Dec. 10, 2013

(54) METHOD AND APPARATUS FOR TEMPORARILY SUSPENDING A NETWORK CONNECTION

(75) Inventor: Frank Pittmann, Berlin (DE)

(73) Assignee: Nokia Siemens Networks Oy, Espoo (FI)

( * ) Notice: Subject to any disclaimer, the term of this patent is extended or adjusted under 35 U.S.C. 154(b) by 604 days.

(21) Appl. No.: 12/674,835

(22) PCT Filed: Aug. 6, 2008

(86) PCT No.: PCT/EP2008/060342
§ 371 (c)(1),
(2), (4) Date: Feb. 23, 2010

(87) PCT Pub. No.: WO2009/027192
PCT Pub. Date: Mar. 5, 2009

(65) Prior Publication Data
US 2011/0116471 A1    May 19, 2011

(30) Foreign Application Priority Data
Aug. 24, 2007 (EP) .................... 07016688

(51) Int. Cl.
*H04W 4/00* (2009.01)
(52) U.S. Cl.
USPC ....................... 370/331; 370/395.2
(58) Field of Classification Search
USPC .............................. 370/331, 395.2
See application file for complete search history.

(56) References Cited

U.S. PATENT DOCUMENTS

| | | | | |
|---|---|---|---|---|
| 7,016,678 B1* | 3/2006 | Kalliokulju et al. | ......... | 455/436 |
| 2006/0227747 A1 | 10/2006 | Kim et al. | | |
| 2007/0025294 A1* | 2/2007 | Kim et al. | ..................... | 370/331 |
| 2008/0198804 A1* | 8/2008 | Rahman et al. | ............... | 370/331 |
| 2009/0238139 A1* | 9/2009 | Kim et al. | ..................... | 370/331 |

FOREIGN PATENT DOCUMENTS

WO    2005/114920 A1    12/2005

OTHER PUBLICATIONS

Ulises Olvera, "Media Independent Handover: Functions and Services Specification," IEEE Standards, Jul. 17, 2006, pp. 1-11, vol. 802.21 MIHO, IEEE, US.
International Search Report, International Application No. PCT/EP2008/060342, Date of Completion: Dec. 1, 2008, Date of Mailing: Dec. 8, 2008, pp. 1-2.
IEEE P802.21/D01.08, "Draft IEEE Standard for Local and Metropolitan Area Networks: Media Independent Handover Services", Aug. 2006, 12 pages.

(Continued)

*Primary Examiner* — Sai-Ming Chan
(74) *Attorney, Agent, or Firm* — Squire Sanders (US) LLP

(57) ABSTRACT

Method for temporarily suspending a network connection is provided, which connection uses a Media Independent Handover Function (300). The method comprises receiving a suspend command in the Media Independent Handover Function (300), detecting the suspend command in the Media Independent Handover Function (300) and suspending the network connection. Furthermore the method comprises receiving a resume command in the Media Independent Handover Function (300), detecting the resume command in the Media Independent Handover Function (300) and resuming the network connection.

22 Claims, 9 Drawing Sheets

(56) References Cited

OTHER PUBLICATIONS

3GPP TR 23.882 V1.4.0, "3rd Generation Partnership Project; Technical Specification Group Services and System Aspects; 3GPP System Architecture Evolution; Report on Technical Options and conclusions (Release 7)", Sep. 2006, pp. 1-159.

3GPP TR 22.259 V8.1.0, "3rd Generation Partnership Project; Technical Specification Group Service and System Aspects; Service Requirements for Personal Network Management (PNM); Stage 1 (Release 8)", Sep. 2006, pp. 2-27.

3GPP TR 22.978 V7.1.0, 3rd Generation Partnership Project: Technical Specification Group Services and System Aspects; All-IP Network (AIPN) Feasibility Study (Release 7), Jun. 2005, pp. 1-63.

Devarapalli, V., "Network Mobility (NEMO) Basic Support Protocol", Network Working Group, Request for Comments: 3963, Jan. 2005, pp. 1-33.

European Search Report application No. 07 016 688.9 dated Jan. 17, 2012.

* cited by examiner

FIG 5

| No | MIH Command | (L)ocal, (R)emote | Remote Direction | Comments |
|---|---|---|---|---|
| 1 | MIH Get Status | L, R | Network→Client | Get the status of links |
| 2 | MIH Switch | L, R | Network→Client | Switch the links as specified |
| 3 | MIH Configure | L, R | Network→Client | Configure a link |
| 4 | MIH Scan | L, R | Network→Client | Scan a link |
| 5 | MIH Handover Initiate | L, R | Client→Network Network→Client | Network or client may initiate handover and send a list of suggested networks and associated Points of Attachment |
| 6 | MIH Handover Prepare | L, R | Network→Network | This command is sent by current MIHF entity to target MIHF entity to allow for resource query and handover preparation |
| 7 | MIH Handover Commit | L, R | Client→Network Network→Client | In this case the client or network commits to do the handover and sends the choice of selected network and associated PoA |
| 8 | MIH Handover Complete | L, R | Client→Network Network→Network | Notification from new serving MIHF to previous serving MIHF indicating handover completion, and any pending pickets may now be forwarded to the new MIHF |
| 9 | MIH Network Address Information | L, R | Network→Network | Send from current serving MIHF entity to target MIHF entity to obtain reconfigured network address on target network for the client |

FIG 6

| No | MIH Command | (L)ocal, (R)emote | Remote Direction | Comments |
|---|---|---|---|---|
| 10 | MIH Go Offline | L, R | Client→Network Network→Client | Network or client may suspend MIH communication and conveys a reason and the anticipated time |
| 11 | MIH Go Online | L, R | Client→Network Network→Client | Network or client may resume MIH communication |

FIG 7

| No | Primitive | Service Category | Description |
|---|---|---|---|
| 23 | MIH Go Offline | Command | Network or client may suspend MIH communication and conveys a reason and the anticipated time |
| 24 | MIH Go Online | Command | Network or client may resume MIH communication |

FIG 8

MIH_Go_Offline.request
 Function:
  This primitive is used by MIH User on network or client side to suspend MIH communication
  and to convey a reason and the anticipated time.
 Semantics of service primitive
  MIH_Go_Offline. request (
   SourceIdentifier,
   DestinationIdentifier,
   SuspendReason,
   AnticipatedTime
  )

FIG 9  MIH_Go_Offline.confirm
Function:
This primitive is used by MIHF to convey the negotiated time duration for the suspension.
Semantics of service primitive
MIH_Go_Offline. confirm (
SourceIdentifier,
DestinationIdentifier,
NegotiatedTime
)

FIG 10

| Name | Type | Valid Range | Description |
|---|---|---|---|
| Source Identifier | Identifier | Any valid individual or group identifier | The identifier of entity where the request is initiated |
| Destination Identifier | Identifier | Valid MIHF identifier | The destination identifier of request or response This is the identifier or local or peer MIHF |
| Suspend Reason | Enumerated | 0-255 | Reason for why requesting the suspension of MIH communication such as indication joining a Nemo-based moving network |
| Anticipated Time | Integer | 0-65535 | Anticipated Time (in seconds) in which the suspension of MIH communication will probably end |

FIG 11

| Suspend Reason Code Id | Suspend Reason Code | Meaning |
|---|---|---|
| 0 | SRC_JOIN_MOVING_NETWORK | The MIH communication is suspended because of joining a Nemo-based moving network |
| ... | ... | ... |

FIG 12

| Name | Type | Valid Range | Description |
|---|---|---|---|
| Source Identifier | Identifier | Any valid individual or group identifier | The identifier of entity where the request is initiated |
| Destination Identifier | Identifier | Valid MIHF identifier | The destination identifier of request or response This is the identifier or local or peer MIHF |
| Negotiated Time | Integer | 0-65535 | Negotiated Time (in seconds) in which the suspension of MIH communication will probably end |

FIG 13 MIH_Go_Online.request
Function:
    This primitive is used by MIH User on network or client side to resume MIH communication.
Semantics of service primitive
    MIH_Go_Online. request (
        SourceIdentifier,
        DestinationIdentifier,
    )

FIG 14

| Name | Type | Valid Range | Description |
|---|---|---|---|
| Source Identifier | Identifier | Any valid individual or group identifier | The identifier of entity where the request is initiated |
| Destination Identifier | Identifier | Valid MIHF identifier | The destination identifier of request or response This is the identifier or local or peer MIHF |

FIG 15

MIH_Go_Online.confirm
Function:
  This primitive is used by MIHF to acknowledge (success or failure) the end of suspension.
Semantics of service primitive
  MIH_Go_Online. confirm (
    SourceIdentifier,
    DestinationIdentifier,
    ResultCode
  )

FIG 16

| Name | Type | Valid Range | Description |
| --- | --- | --- | --- |
| Source Identifier | Identifier | Any valid individual or group identifier | The identifier of entity where the request is initiated |
| Destination Identifier | Identifier | Valid MIHF identifier | The destination identifier of request or response This is the identifier of local or peer MIHF |
| Resume Result Code | Enumerate | Success; Failure | Result of trying to resume MIH communication |

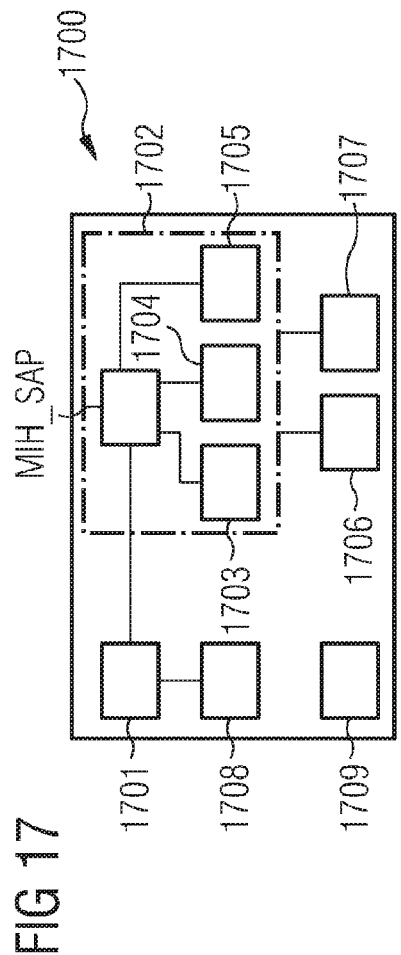

FIG 17

METHOD AND APPARATUS FOR TEMPORARILY SUSPENDING A NETWORK CONNECTION

FIELD OF THE INVENTION

The present invention relates to the field of communication networks. In particular the invention relates to a method for temporarily suspending a network connection, a computer-readable medium in which a corresponding method is stored, a program element, which is adapted to carry out a corresponding method, an apparatus for temporarily suspending a network connection, a MIH Go Offline command and a MIH Go Online command.

ART BACKGROUND

The scope of Media Independent Handover (MIH) standard is to develop a specification that provides link layer intelligence and other related network information to upper layers to optimize handovers between heterogeneous media. This includes links specified by 3GPP, 3GPP2 and both wired and wireless media in the IEEE 802 family of standards.

The IEEE 802.21 standard proposes a standardized mechanism to optimize mobility in terms of reducing the handover delay and packet loss in a heterogeneous access network environment by a MIH communication between network and mobile terminal.

In order to facilitate handover between heterogeneous media, link layer intelligence and network information is provided to upper layers. These upper layers are called MIH Users.

Criteria for the handover are minimal data loss and break time without user intervention, support of applications of different tolerance characteristics and providing means for obtaining quality of service (QoS) information of a neighbour network.

IEEE 802.21, Draft IEEE Standard for Local and Metropolitan Area Networks: Media Independent Handover Services, IEEE P802.21/D01.08, August 2006 discloses a standard for supporting handovers between heterogeneous networks.

A framework for an evolution or migration of the 3GPPP is known from the document 3GPP TR 23.882 V1.4.0 (2006-09), 3GPP System Architecture Evolution: Report on technical Options and Conclusions (Release 7).

A personal network management is known from the document 3GPP TS 22.259 V8.1.0 (2006-09), Service requirements for Personal Network Management (PNM); Stage 1 (Release 8).

The document 3GPP TR 22.978 V7.1.0 (2005-06), Technical Specification Group Services and Systems Aspects; All-IP Network (AIPN) feasibility study (Release 7) discusses the feasibility of the progression of the 3GPP system to an AIPN.

The document V. Devarapalli, R. Wakikawa, A. Petrescu, P. Thubert, "Network Mobility (NEMO) Basic Support Protocol", RFC3963, IETF January 2005 discloses a network mobility (NEMO) basic support protocol enabling mobile networks to attach to different points in the internet.

The known concepts of MIH consider terminal mobility. There may be a need to support moving networks as mobility endpoints.

SUMMARY OF THE INVENTION

Thus, a method for temporarily suspending a network connection, which connection is using a Media Independent Handover Function (MIHF), a computer-readable medium, in which a computer program for temporarily suspending a network connection is stored, which, when being executed by a processor, is adapted to carry out the corresponding method, a program element for temporarily suspending a network connection, which, when being executed by a processor, is adapted to carry out the corresponding method, an apparatus for temporarily suspending a network connection, a MIH Go Offline command and a MIH Go Online command is provided.

According to an aspect of the present invention, a method for temporarily suspending a network connection is provided. The network connection is prepared for media independent handover and therefore, the network connection is using the MIHF.

When the MIHF receives a command, which command is a suspend command, the MIHF detects the suspend command and suspends the network connection.

According to another aspect of the present invention, a computer-readable medium is provided. Examples for a computer readable medium are a hard-disc, a floppy-disc, a CD ROM, a DVD ROM, a blue-ray disc, an EPROM or an EEPROM etc. In this computer-readable medium a computer program for temporarily suspending a network connection is stored. The computer program is adapted that when a processor executes the computer program, the above-mentioned method is carried out.

According to a further aspect of the present invention, a program element for temporarily suspending a network connection is provided. The program element is adapted that when a processor executes the program element, the above-mentioned method is carried out.

According to yet another aspect of the present invention, an apparatus for temporarily suspending a network connection is provided. The network connection is a MIH network connection using a MIHF.

The apparatus comprises a Media Independent Handover Function (MIHF) device. The MIHF device comprises a receiving device and a suspend command detecting device. The suspend command detecting device is connected to the receiving device. The MIHF device provides a MIH function.

The apparatus further comprises a suspension device, which is connected to the MIHF device.

The receiving device is adapted for receiving a suspend command and the suspend command detecting device is adapted for detecting the suspend command as a suspend command.

The suspension device is adapted to suspend the network connection if a suspend command is received and detected.

According to a further aspect of the present invention, a MIH Go Offline command or Go Offline primitive is provided. The MIH Go Offline command is adapted to be detected or determined by the MIHF or MIHF device. Further, the MIH Go Offline command is adapted such, that when the MIH Go Offline command is determined by the MIHF, the suspension of a MIH connection is triggered.

According to another aspect of the present invention, a MIH Go Online command or MIH Go Online primitive is provided. The MIH Go Online command is adapted to be determined by the MIHF or MIHF device. Further, the MIH Go Online command is adapted such, that when the MIH Go Online command is detected or determined by the MIHF, the resuming of a MIH Connection is triggered.

Suspending an active MIH network connection may help when a user equipment (UE) or connection end point using this connection disappears for a predetermined, anticipated or negotiated period of time.

Disappearing in this context means for example that an UE enters a mobile network. Such a mobile network may have a own MIH connection and thus, the MIH connection of the UE may be not required during the time the UE is connected to the mobile network.

IEEE 802.21 may propose a mechanism to support mobility in terms of reducing the handover-delay and packet loss in a heterogeneous access network environment by the MIH communication between a network element and a mobile terminal or UE.

IEEE 802.21 may be independent of a chosen mobility management (MM) protocol, although IEEE 802.21 may provide means to improve the mobility process. In 3GPP System Architecture Evolution (SAE)/Long Term Evolution (LTE) Mobile IP (Internet Protocol), proxy MIP (Mobile IP) or NETLMM (Network-based Localized Mobility Management) are considered as mobility protocols for mobility between 3GPP and non 3GPP networks.

These protocols may support terminal mobility. In other words these protocols may support network connections from one mobile or fixed terminal to another mobile or fixed terminal as endpoints of the connection. An example for such a network connection may be a connection from a mobile phone to a Web server. At least one of the endpoints may be called a corresponding node or a CN.

Suspending the network connection however, may help to support the MM process with respect to other types of mobility endpoints. Such other types of mobility endpoints may be a personal area network (PAN) or a moving network.

Suspending an existing MIH network connection may support joining a moving network. Suspending may support to actively go offline when a UE joins a moving network.

Actively going offline may support to orderly suspend an active MIH connection. The network, the network connection or the MIHF may receive information about the status of the MIH connection or the planned connection behaviour of the user of a network connection.

A moving network may be deployed in a train or bus. Such a moving network may be called a hot spot area. The hot spot area may be joined or left by a plurality of users, subscribers, user equipments (UE) or terminals.

Suspending an active MIH connection may reduce the signaling load in the network. Furthermore, network resources or radio network resources may be freed. Additionally, processing power may be freed as well. Furthermore, relevant processing in an UE may be stopped and thus, saving battery power in the UE. Besides this, by suspending the MIH network connection, a proper protocol handling may be performed. And furthermore, since context information may be still available the MIH connection may efficiently be established.

In other words, suspending the MIH connection may help preventing to set up the MIH connection from the scratch, when rejoining a network. Thus, suspending may help preventing sending set up commands in order to establish a MIH connection.

In the following, further exemplary embodiments of the method for temporarily suspending a network connection will be described. These embodiments apply also for the computer-readable medium, the program element, for the apparatus, for the MIH Go Offline command and for the MIH Go Online command.

According to an aspect of the present invention, the method comprises sending the suspend command.

Sending the suspend command may initiate the method for suspending.

According to a further aspect of the present invention, the network connection is a MIH connection.

For performing media independent handover, a plurality of parameters, e.g. data rate or quality of service (QoS) are stored for a connection. Some parameters of the plurality of parameters are negotiated during a set up of a MIH connection.

Suspending may prevent the negotiation of such parameters when rejoining a MIH network. For negotiating the parameters, signaling information may be required. Such signaling information my produce signaling load. Thus, suspending a MIH connection may reduces the signaling load.

The suspend command may be a MIH Go Offline command.

According to another aspect of the present invention, the MIHF comprises a local MIHF and a remote MIHF, wherein the local MIHF and the remote MIHF have a communication relationship.

The local MIHF and the remote MIHF may be separated and may be located on different entities e.g. a UE like a mobile phone or a network device, e.g. a network node or a server.

The separation may allow to administrate network connections for a remote MIHF located on a network node. The separation may also allow to administrate the UE, when the local MIHF is located on the UE.

According to a further aspect of the present invention suspending the network connection or communication comprises storing a context of the network connection.

Storing the context of a network connection may allow at different points in time to resume the connection. The context of a network connection e.g. is a parameter or a plurality of parameters, which characterize an individual connection, wherein the connection is set-up by an individual user.

According to another aspect of the present invention, the suspend command origins from a user device.

Therefore, a user or user device or UE may be able to suspend a MIH network connection.

According to another aspect of the present invention, the suspend command origins from a network device.

Therefore, the network connection may also be suspended by the network.

According to a further aspect of the present invention, the method further comprising confirming the receipt of the suspend command.

Confirming the receipt of the suspend command may allow a user to verify the safe receipt of the command.

According to yet another aspect of the present invention, the method further comprises detecting a trigger event for suspending the network connection and initiating sending the suspend command when the trigger event is detected. Examples for trigger events are joining or leaving the moving network. The trigger may be initiated by the user or by the network.

Detecting a trigger event and reacting respectively may allow to react to different situations and scenarios differently. In these situations the UE may send commands automatically, without being triggered by a user.

According to another aspect of the present invention, the trigger event for suspending the network connection is joining a mobile network.

The UE may detect the requirement of suspending a MIH connection automatically when a mobile network or hot spot is joined or entered.

According to a further aspect of the present invention, the suspend command is a MIH command.

The suspend command may integrate in the MIHF architecture if the suspend command is a MIH command. Thus, the MIHF may understand the suspend command.

According to another aspect of the present invention, the network connection is suspended for a predetermined time duration.

Suspending the network connection for a predetermined, anticipated, negotiated or limited time duration, may allow deleting context, which may not be used.

According to another aspect of the present invention, the method further comprises deleting the stored context if the connection is not resumed within the predetermined time duration.

By deleting the context after a predetermined time duration resources may be freed.

According to another aspect of the present invention, the method further comprises receiving a resume command in the MIHF, detecting the resume command in the MIHF and resuming the suspended network MIH connection.

The resume command may be the MIH Go Online command. By sending this command, a suspended connection may actively be resumed. By actively resuming a connection, the user, UE or terminal may decide, when a suspended connection is resumed.

Actively suspending or actively resuming may be initiated or triggered by pushing a button on the UE, e.g. the mobile phone. Thus, a user may be required for initiating the suspending process or the resuming process. In contrary, suspending and resuming may also be automatically initiated.

According to another aspect of the present invention, the method further comprises sending a resume command.

According to a further aspect of the present invention, the resume command origins from an user device.

According to a further aspect of the present invention, the resume command origins from a network device.

According to another aspect of the present invention, the method further comprises confirming the receipt of the resume command.

Confirming the receipt of the resume command may allow to increase the reliability of the communication between a UE and the MIHF, since the user or MIH user receives an acknowledgement for the sent command.

According to another aspect of the present invention, the method further comprises detecting a trigger event for resuming the network connection.

The method for suspending and resuming may be automated and may prevent the involvement of a user for controlling the suspending or resuming.

According to another aspect of the present invention the trigger event for resuming the suspended network connection is leaving a mobile network.

The leaving of a mobile network may be detected by a reduced field strength for the radio connection. Having a field strength lower than a threshold may allow an UE to realize that the UE leaves a mobile network. Using such a functionality may help to automate the resuming of a network connection.

In the following, further exemplary embodiments of the apparatus for temporarily suspending a network connection will be described. These embodiments apply also for the method for temporarily suspending a network connection, for the computer-readable medium, for the program element, for the MIH Go Offline command and for the MIH Go Online command.

According to another aspect of the present invention the apparatus comprises a sending device connected to the receiving device, wherein the sending device is adapted for sending the suspend command.

The sending device may provide a functionality of upper layers.

According to a further aspect of the present invention the MIHF device comprises a local MIHF device and a remote MIHF device, wherein the local MIHF device and the remote MIHF device have a communication relationship.

In other words, the local MIHF device receives a local command. This local command may control or may monitor a network parameter or a link parameter, for example QoS. Since the network parameter may be controlled or may be monitored in the network, a message may be produced in the local MIHF device. The message may be sent to the remote MIHF device, in order to control or monitor the network parameter.

According to a further aspect of the present invention, the local MIHF device and the remote MIHF device are located on different apparatus.

According to another aspect of the present invention, the suspension device is adapted to store a context of the network connection for a predetermined time or time interval.

For storing the context the suspension device may comprise a memory. By storing the context of a MIH connection, a MIH connection may quickly be resumed.

According to a further aspect of the present invention, the receiving device is adapted for receiving a suspend command, which suspend command origins from a user device.

The MIHF may be implemented on a mobile device, e.g. a PDA or mobile phone. Thus, a receiving device which may be adapted for receiving a suspend command may allow to control suspending of a MIH connection with such a mobile device.

According to a further aspect of the present invention, the receiving device is adapted for receiving a suspend command, which origins from a network device.

The requirement may exist to suspend a MIH connection by a network device. A MIH connection may be suspended by the network when a user enters or joins a moving network. By joining the moving network, the MM is transferred to the MR in the moving network. If the existing MIH connection, which may be not needed anymore, is not actively suspended by the user, the network may detect the connection and suspends the connection for a predetermined time duration.

According to yet another aspect of the present invention, the MIHF device further comprises a confirmation device. The confirmation device may be connected to the receiving device.

Such a confirmation device may be adapted for sending a confirmation message to the originator of the suspend command. By receiving a confirmation message, the originator of the suspend command may be informed, that the suspending of the MIH connection is going on.

Originator of a suspend command may be a MIH user. A MIH User may be a higher layer or an external device.

According to a further aspect of the present invention, the apparatus further comprises a trigger device connected to the sending device. The trigger device is adapted for detecting a trigger event for suspending the MIH network connection. The trigger device is further adapted or configured to initiate sending a suspend command by the sending device.

According to another aspect of the present invention, the trigger device is adapted for detecting joining a mobile network. In other words, when a UE comprising a trigger device may join a mobile network, the trigger device sends a suspend command.

The suspend command may be automatically sent when joining the mobile network. Therefore, the task of sending a suspend command may be automated.

According to another aspect of the present invention, the apparatus further comprises a timer device. The timer device is adapted for suspending the network connection for a predetermined time duration.

Context, which may be stored when a MIH network connection is suspended may use storage space. Many MIH connections may be suspended at the same time. Context of connections which may not resume after a certain time or negotiated time may be deleted in order to free storage space.

According to a further aspect of the present invention, the MIHF device further comprises a resume command detecting device. The resume command detecting device is connected to the receiving device.

The apparatus further comprises a resume device, wherein the resume device is connected to the MIHF device.

The receiving device is adapted for receiving a resume command. The resume command detecting device is adapted for detecting the resume command and for identifying the resume command as the resume command.

The resume device is adapted to resume the suspended MIH network connection.

According to another aspect of the present invention, the sending device is adapted for sending the resume command.

According to yet another aspect of the present invention, the receiving device is adapted for receiving a resume command which origins from an user device.

According to yet another aspect of the present invention, the receiving device is adapted for receiving a resume command which origins from a network device.

According to a further aspect of the present invention, the confirmation device is adapted for confirming the resume command.

Thus, the originator or sender of a resume command may get a confirm message by the confirmation device.

According to a further aspect of the present invention, the trigger device is adapted for detecting a trigger event for resuming the suspended MIH network connection. The trigger device is further adapted for triggering the sending device for sending the resume command.

A trigger event may be the leaving of a mobile network.

According to a further aspect of the present invention, the apparatus is a mobile device or a network node of a telecommunication network.

These and other aspects of the present invention will become apparent from and elucidated with reference to the embodiments described hereinafter.

Exemplary embodiments of the present invention will be described in the following, with reference to the following drawings.

BRIEF DESCRIPTION OF THE DRAWINGS

FIG. 5 shows a selection of MIH commands for a better understanding of the present invention.

FIG. 6 shows MIH commands according to an exemplary embodiment of the present invention.

FIG. 7 shows MIH_SAP primitives according to an exemplary embodiment of the present invention.

FIG. 8 shows a MIH_Go_Offline.request primitive according to an exemplary embodiment of the present invention.

FIG. 9 shows a MIH_Go_Offline.confirm primitive according to an exemplary embodiment of the present invention.

FIG. 10 shows parameters of the MIH_GO_Offline.request primitive according to an exemplary embodiment of the present invention.

FIG. 11 shows a suspend reason code according to an exemplary embodiment of the present invention.

FIG. 12 shows parameters of the MIH_Go_Offline.confirm primitive according to an exemplary embodiment of the present invention.

FIG. 13 shows a MIH_Go_Online.request primitive according to an exemplary embodiment of the present invention.

FIG. 14 shows parameters of the MIH_Go_Online.request primitive according to an exemplary embodiment of the present invention.

FIG. 15 shows a MIH_Go_Online.confirm primitive according to an exemplary embodiment of the present invention.

FIG. 16 shows parameters of the MIH_Go_Online.confirm primitive according to an exemplary embodiment of the present invention.

FIG. 17 shows a block diagram of an apparatus according to an exemplary embodiment of the present invention.

DETAILED DESCRIPTION

Figure 1:
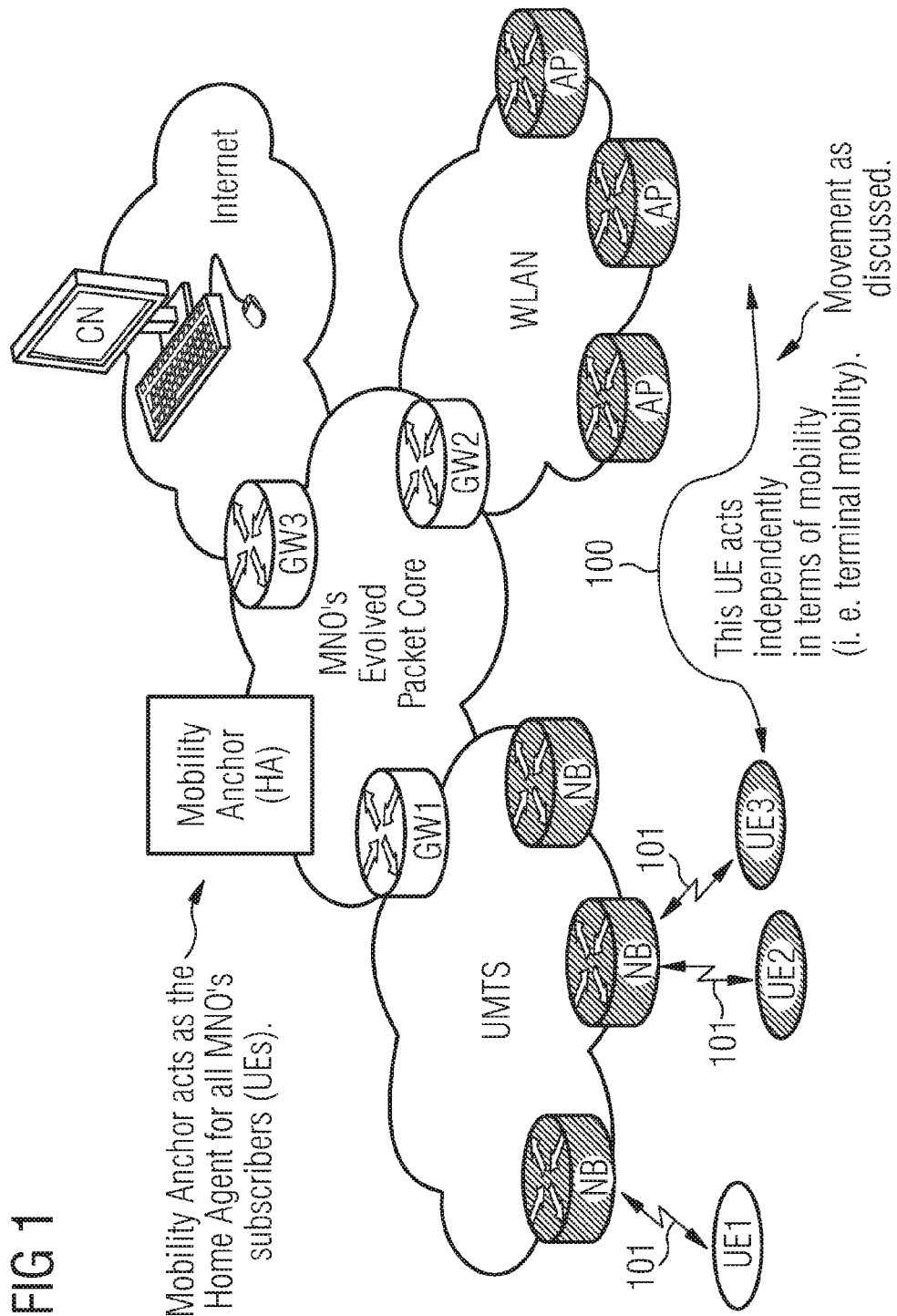
FIG. 1 shows a scenario showing terminal mobility for a better understanding of the present invention.

The illustration in the drawings is schematic. In different drawings, similar or identical elements are provided with the same reference numerals.

FIG. 1 shows a scenario for terminal mobility for a better understanding of the present invention. The terminals or user equipments UE1, UE2, UE3 are connected via wireless connections 101 to the Nodes B NB of the UMTS (Universal Mobile Telecommunications System) network. The UMTS network UMTS is connected via the gateway GW 1 to the MNO's (mobile network operator) Evolved Packet Core (EPC).

Via a second gateway GW 2, the MNO's EPC is connected to a wireless local area network (WLAN), which may also be a WiMAX (Worldwide Interoperability for Microwave Access) network.

The wireless network WLAN uses access points AP to connect to user equipment.

The gateway to the internet GW 3 provides internet access to the user equipment UE1, UE2, UE3.

The mobility anchor for mobility between UMTS and WLAN/WIMAX with respect to the user equipment UE1, UE2, UE3 is the HA (home agent).

Movement 100 shows a possible movement of the user equipment, while a user of the user equipment is moving or roaming. The user may use the user equipment UE1, UE2, UE3 for telecommunication or data transmission. The user equipment may be a mobile device e.g. a mobile phone or a PDA. This mobile device may be based on a cellular standard like UMTS, GSM as defined in 3GPP or on an IP protocol, e.g. WLAN or WiMAX. The connection in both cases may be a fixed line connection, a wireless connection, a tunnel or a virtual connection.

Mobility between 3GPP network UMTS and non 3GPP network WLAN is supported by Mobile IP with the related HA in the MNO's EPC.

A terminal or user equipment UE1, UE2, UE3 moves from the 3GPP network UMTS to the non 3GPP network WLAN. The communication connection (not shown in FIG. 1) may be retained during the change of the network. Retaining the network connection, in particular retaining a MIH connection, may use the mechanism of handover.

The terminal moving from UMTS to WLAN uses Mobile IP and IEEE 802.21 for retaining the established MIH connection. The user equipment acts independently in terms of mobility, i.e. terminal mobility.

A mobility anchor HA acts as the Home Agent for all MNO's subscribers UE1, UE2, UE3.

Figure 2:
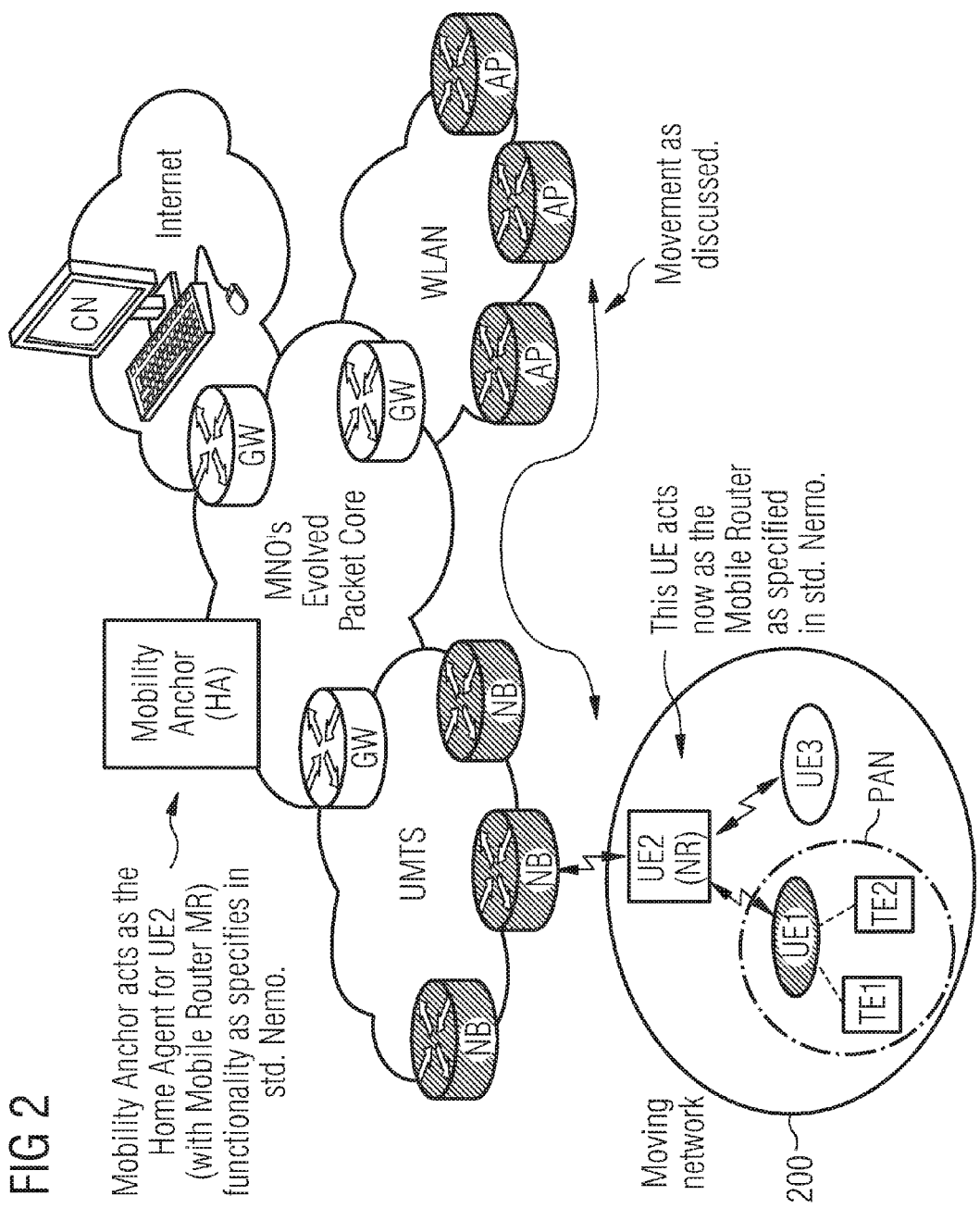
FIG. 2 shows a scenario considering a PAN or a moving network connected to a 3GPP network according to an exemplary embodiment of the present invention.

FIG. 2 shows a scenario considering PAN (personal area network) or moving network connected to a 3GPP network according to an exemplary embodiment of the present invention.

In FIG. 2 a PAN is built with user equipment UE1. The user equipment UE1 connects two terminals TE1, TE2. Terminals TE1, TE2 may be Bluetooth devices.

User equipment UE2 builds the mobile router MR as specified for NEMO (Network Mobility Basic Support Protocol) 200. The network 200 is a mobile network 200 or a hot spot 200, which for example is built inside a public transport, e.g. a train, air plane or bus.

The mobility anchor HA acts as the Home Agent for user equipment UE2, MR. The functionality may be specified in NEMO.

NEMO supports the composition of PANs or moving networks. The moving network comprises the PAN and the individual user equipment UE3 and UE2. The user equipment UE2 hosts the mobile router functionality MR.

The mobile router MR, UE2 performs mobility management on behalf of the other attached or connected terminals or user equipments UE1, UE3. The mobile router MR, UE2 acts as the mobile router as specified in NEMO.

The IEEE 802.21 MIH does not support a terminal joining and leaving a mobile network.

An example for a mechanism for administrating a mobile network, e.g. is MM (mobility management), which is delegated to a mobile router MR when a terminal UE1, UE3 is joining the moving network 200.

The individual terminals UE1, UE3 may have an active MIH connection, which connection was established before entering the mobile network 200.

The mobile router MR, UE2 also has established a MIH connection. This connection established with UE2 will continue, even when an individual terminal UE1, UE3 enters the mobile network 200. By continuing the MIH connection of UE2, the user equipment UE2 is able to perform an optimized handover. The handover may also be optimized by user equipment UE2 on behalf of the other user equipments UE1, UE2 or PANs in the moving network 200.

Two MIH connections would exist if an individual terminal UE1, UE3 joins the moving network 200. To prevent the existence of two connections to the same endpoint at the same time, the individual established MIH connection may be suspended for the time the individual terminal UE1, UE3 joins the mobile network 200.

An extension to the MIH protocol allows to actively go offline or suspending the MIH connection and to actively go online or resuming the suspended MIH connection. E.g. the terminals UE 1 and UE3 use this extension, when joining or leaving the moving network 200.

To suspend a MIH communication via a proper protocol handling by indicating the reason and as a further extension or additional parameter an anticipated time duration may support the mobile network.

Mobility support may go far beyond terminal mobility. The reason for going offline enables the network of being able to react properly based on that knowledge. The anticipated time duration or negotiated time duration provides additional information, which otherwise is only known on terminal side. This time duration is the expected time duration off being offline.

The information of the expected offline time duration can be used for efficient processing of the suspension request directed to the network. The information may also be used for determining a maximum time duration for storing user equipment context or context of an individual MIH connection.

Terminals UE1, UE3 will send the MIHF command MIH Go Offline when joining the moving network 200, e.g. a train's moving network. The MIH Go Offline command comprises parameters, which parameters indicate that the terminals UE1, UE3 are temporarily joining a moving network. The parameters may indicate that the terminals UE1, UE3 plan to join the moving network for 5 minutes.

The MIHF at the network side can use the parameters provided with the MIH Go Offline Command and the MIHF can decide to store the context of the user equipment UE1, UE3 by considering the provided parameters.

For example, the MIHF decides to store the context for 10 minutes, wherein the MIHF assumes additional tolerance, which is basically the negotiated time between network and user equipment. The MIH context is stored on both endpoints of the MIH connection for 10 minutes.

In the following it is assumed that user equipment UE1 is going online again after 8 minutes by sending the MIH Go Online command.

The user equipment UE3 however, is assumed to stay in the moving network 200 for a longer time duration than the negotiated 10 minutes.

The context of the MIH connection belonging to user equipment UE1 is still available on network side and on terminal side. Thus, no MIH communication set up from the scratch is necessary, when user equipment UE1 is leaving the mobile network. I.e. no set up via system management primitives and messages or no registration for necessary events is required. Therefore, the load which is caused by signaling information is reduced. In particular load on the expensive radio interface is reduced.

In this way, the radio resources may be efficiently used.

The context of user equipment UE3, however, is lost. Therefore, when user equipment UE3 is leaving the mobile network 200 the complete set up of the MIH communication is causing an inefficient use of the radio resources.

The extension to the MIHF with the commands MIH Go Offline and MIH Go Online can be used to suspend a MIH communication or MIH network connection for a predetermined or negotiated time duration. Furthermore, providing or exposing a reason for the corresponding suspension enables an intelligent processing at both ends of the MIH communication. The both ends are the MIHFs on terminal side and on the network side.

Figure 3:
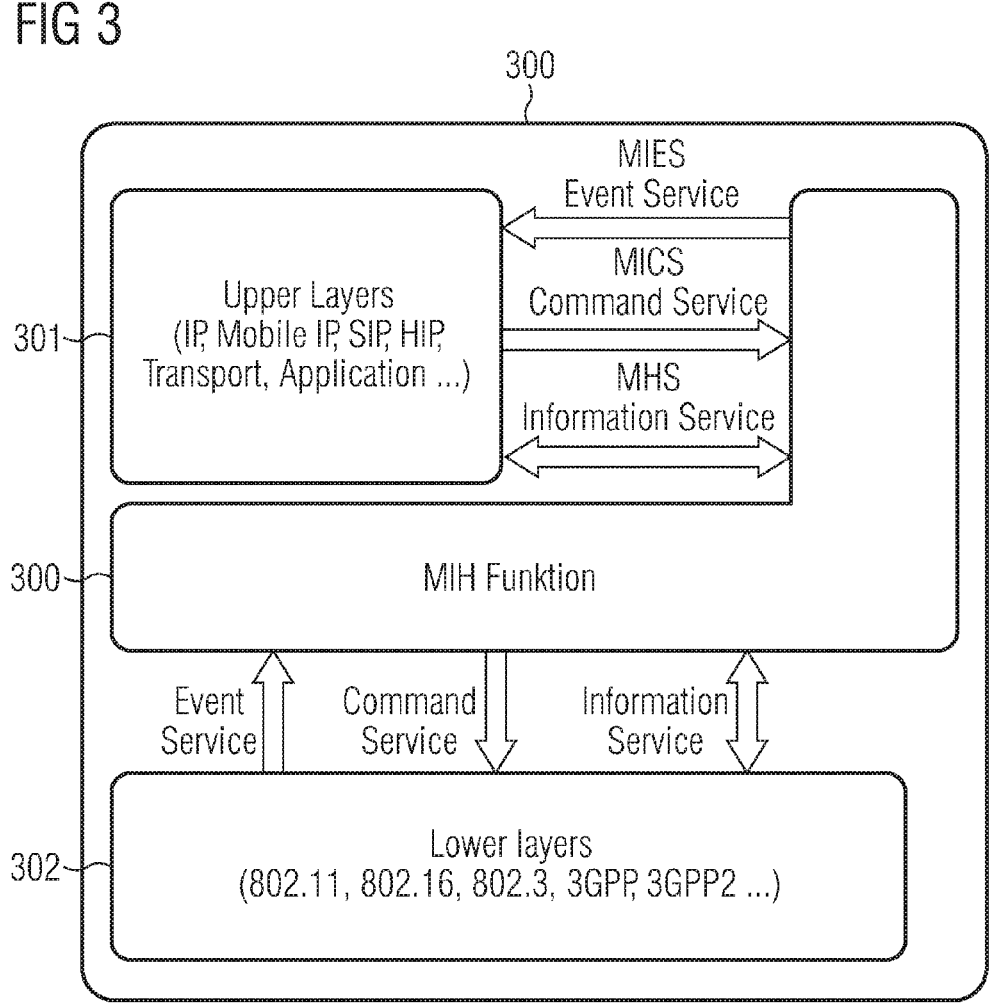
FIG. 3 shows a MIH function according to an exemplary embodiment of the present invention.

FIG. 3 shows a MIH function according to an exemplary embodiment of the present invention. Such a MIHF may be implemented in a MIHF device.

The MIHF 300 provides to higher layer 301 or MIH User 301 basic services and corresponding service access points (SAP) (not shown in FIG. 3) and primitives. The services provided for MIH user 301 comprise a Media Independent Event Service (MIES), a Media Independent Command Service (MICS) and a Media Independent Information Service (MIIS).

The MIHF also provides communication in the direction to lower layers 302, e.g. 802.11, 802.16, 802.3, 3GPP, 3GPP2 etc.

Figure 4:
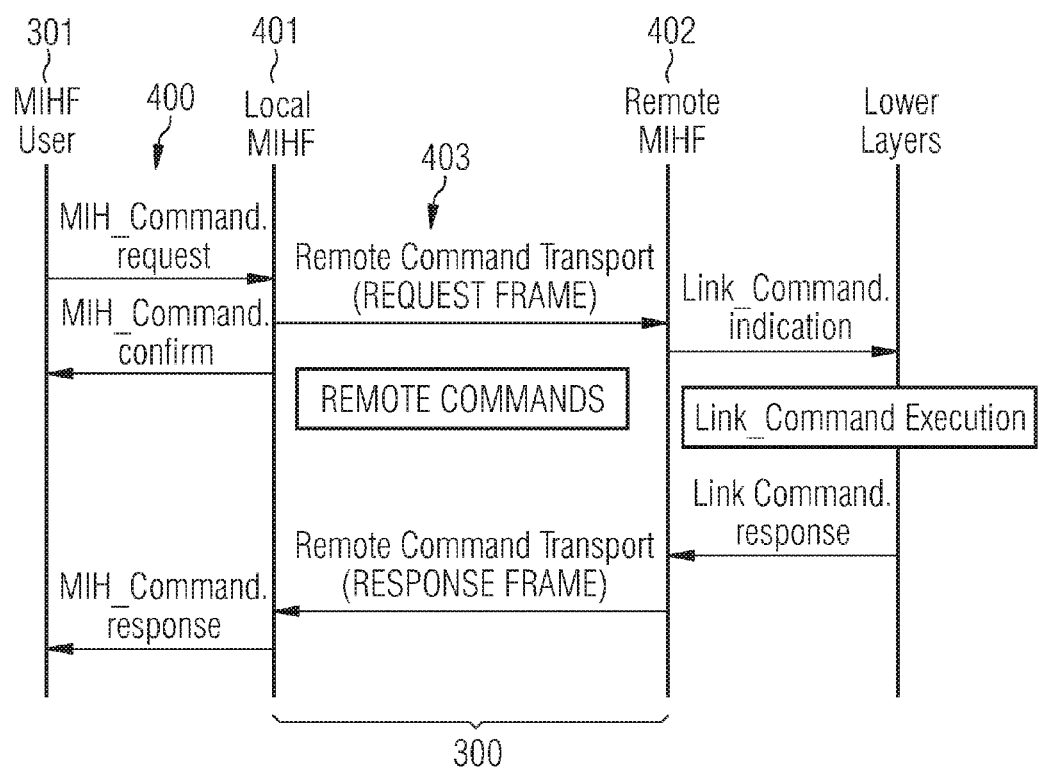
FIG. 4 shows a command service flow model according to an exemplary embodiment of the present invention.

FIG. 4 shows a command service flow model according to an exemplary embodiment of the present invention. The command service flow model relates to all specified commands of MICS. This model is a basic flow model, which is also valid for the MIH_Go_Offline command and the MIH_Go_Online command respectively.

As can be seen in FIG. 4, the MIHF function may be split in a local MIHF 401 and a remote MIHF 402 representing both ends of a MIH connection. The local MIHF 401 and the remote MIHF 402 may be located on physically separated elements.

The local MIHF 401 may be located on a mobile device or user equipment and exchanging commands or primitives 400 MIH_Command.request, MIH_Command.confirm, MIH_Command.response with the MIHF User 301. The local MIHF 401 is preparing corresponding messages for Remote Command Transport 403 to communicate with the remote MIHF 402. The local MIHF 401 and the remote MIHF 402 have a communication relationship 403 and build the MIHF 300.

The remote MIHF 402 receives the messages 403 and prepares or receives link commands Link_Command.indication, Link_Command.response in order to communicate with lower layers. The lower layers may be network links providing status information about the link status.

FIG. 5 shows a selection of MIH commands for a better understanding of the present invention. These MIH commands belong to the MICS.

FIG. 6 shows MIH commands according to an exemplary embodiment of the present invention. The MIHF provides MIES, MICS and MIIS, which support handovers across heterogeneous networks. Before MIES, MICS and MIIS is provided to the MIH user, a MIH entity needs to be set up properly using some System Management primitives 400 and messages 403.

The command for suspending is defined as the MIH Command MIH Go Offline as indicated with number No 10. Even if for this example the No 10 is selected choosing any other number may be possible. The MIH Go Offline command can be used locally or remotely and the direction is either client to network or network to client. The network or the client may suspend the MIH communication and conveys a reason and the anticipated time.

The command for resuming has the number No 11. Even if for this example the No 11 is selected choosing any other number may be possible. The name for this MIH command is MIH Go Online. This command may be local or remote and the remote direction either be from client to the network or from the network to the client. The network or the client may resume a MIH communication.

These two commands may be an extension of MICS, wherein the number No may be selected to be greater then 10. The extension does not affect MIES, MIIS and the system management.

The MIH commands MIH Go Offline and MIH Go Online extend the MICS.

The proposed MIH commands MIH Go Offline and MIH Go Online refer to the media independent service access point MIH_SAP. The MIH_SAP defines the interface between MIHF and MIH user 300.

FIG. 7 shows MIH_SAP primitives according to an exemplary embodiment of the present invention.

New MIH_SAP primitives are defined. Number No 23 defines a primitive for MIH Go Offline. Besides No 23 any other number, which may be useful can be implemented. The service category of this primitive is command. The network or client receiving a MIH Go Offline primitive may suspend MIH communication and conveys a reason and the anticipated time.

With number No 24 the new primitive MIH Go Online is defined. This primitive is a command. Besides No 24 any other number, which may be useful can be implemented. The network or the client receiving a MIH Go Online primitive may resume a MIH communication.

The corresponding specification of the service primitives No 23 and No 24 are depicted in FIG. 8 and FIG. 9.

FIG. 8 shows a MIH_Go_Offline.request primitive according to an exemplary embodiment of the present invention.

FIG. 9 shows a MIH_Go_Offline.confirm primitive according to an exemplary embodiment of the present invention.

As can be seen in FIG. 8, the primitive MIH_Go_Offline.request comprises the parameters SourceIdentifier, DestinationIdentifier, SuspendReason and AnticipatedTime. The names of the parameters may be selected to describe the meaning of the parameter. E.g. SuspendReason is a parameter or variable providing a reason or a reason code for the suspension. These parameters are depicted in FIG. 10 with a corresponding description.

The MIH_Go_Offline.request primitive is used by MIH User on network or client side to suspend MIH communication and to convey a reason and the anticipated time. The function of this primitive is to suspend the MIH communication and to convey a reason and the anticipated time.

As can be seen in FIG. 9, the primitive MIH_Go_Offline.confirm comprises the parameters SourceIdentifier, DestinationIdentifier and NegotiatedTime. These parameters are depicted in FIG. 12 with a corresponding description.

The MIH_Go_Offline.confirm primitive is used by MIHF to convey the negotiated time duration for the suspension.

The parameter Suspend Reason Code as depicted in FIG. 10 provides a reason for why the suspension of a MIH communication is requested. For example a reason may be joining a NEMO-based network. A valid range for values of reasons ranges from 0 to 255.

The Suspend Reason Code for MIH_Go_Offline may be one or a combination of the reasons depicted in FIG. 11. E.g. Suspend reason code id 0 is used for suspend reason SRC_JOIN_MOVING_NETWORK. In other words this means that the MIH communication is suspended because of joining a NEMO based moving network.

The MIH_Go_Offline.request primitive is generated, by MIH User 301 on network or on client side, which may want to suspend a MIH communication and expose or provide the reason and the anticipated time.

When the MIH_Go_Offline.request primitive is receipt, a MIHF capable entity may respond with MIH_Go_Offline.confirm primitive of FIG. 9.

The parameters of FIG. 10 further comprise the Anticipated Time parameter. Therein the time in seconds is specified, in which time the suspension of a MIH communication may end. A valid range for values of reasons ranges from 0 to 65535.

FIG. 10 further shows a Source Identifier, which is of an Identifier type. A valid range for the Source Identifier is any valid individual or group identifier. Source Identifier is the identifier of entity where the request is initiated.

The Destination Identifier has the type Identifier and a valid range is a valid MIHF identifier. The Destination Identifier provides the destination identifier of a request or response. This is the identifier of local or peer MIHF.

The MIH_Go_Offline.confirm primitive is generated when the MIH_Go_Offline.request primitive is received by the MIHF; e.g. a timer residing in the local MIHF or the remote MIHF is set to NegotiatedTime (see FIG. 12) for maximum storage of UE's context.

When the MIH_Go_Offline.confirm primitive is received, the receiving entity becomes aware of the negotiated time duration for the requested suspension. E.g. NegotiatedTime=0 may indicate a rejection or failure of the request.

FIG. 13 shows a MIH_Go_Online.request primitive according to an exemplary embodiment of the present invention. This primitive is used by MIH User on network or client side to resume MIH communication.

The parameters Source Identifier and Destination Identifier of the MIH_Go_Online.request primitive are depicted in FIG. 14. The Source Identifier parameter has the type Identifier and a valid range is any valid individual or group identifier. Source Identifier is the identifier of entity where the request is initiated.

The Destination Identifier has the type Identifier and a valid range is a valid MIHF identifier. The Destination Identifier provides the destination identifier of a request or response. This is the identifier of local or peer MIHF.

The MIH_Go_Online.request primitive is generated by the MIH User on network or on client side, dependent on the side, which want to resume a MIH communication.

When the MIH_Go_Online.request primitive is received by a MIHF capable entity, the entity may respond with a MIH_Go_Online.confirm primitive as depicted in FIG. 15.

The parameters of the MIH_Go_Online.confirm primitive are depicted in FIG. 16.

The MIH_Go_Online.confirm primitive is generated when MIH_Go_Online.request primitive is received by a MIHF conveying or providing the current status of the MIH communication. This primitive uses the parameters SourceIdentifier, DestinationIdentifier and ResultCode. This primitive is used by MIHF to acknowledge (success or failure) the end of suspension.

The Source Identifier parameter has the type Identifier and a valid range is any valid individual or group identifier. Source Identifier is the identifier of entity where the request is initiated.

The Destination Identifier has the type Identifier and a valid range is a valid MIHF identifier. The Destination Identifier provides the destination identifier of a request or response. This is the identifier of local or peer MIHF.

The parameter Resume Result Code or Resume Result has the type enumerate. The valid range is Success or Failure, wherein this parameter provides the result of trying to resume MIH communication.

When the MIH_Go_Online.confirm primitive is received, the receiving entity becomes aware of the end of suspension of an MIH communication.

Furthermore new messages or additional messages for command service category are proposed.

The MIH_Go_Offline Request message is used by a MIH User 301 on network side or on client side to suspend MIH communication and to convey a reason and the anticipated time.

The parameter SuspendReason uses the parameter type Suspend Reason Code with the type length value (TLV) 26. The TLV of SuspendReason may be any other value than 26.

The parameter AnticipatedTime uses the parameter type Time Interval 2 with the TLV 244. The TLV of AnticipatedTime may be any other value than 244.

The MIH_Go_Offline Response message is used by MIHF to convey the negotiated time duration for the suspension.

The parameter NegotiatedTime uses the parameter type Time Interval 2 with the TLV 244.

The MIH_Go_Online Request message is used by the MIH User 301 on the network or client side to resume MIH communication. No Parameters are applicable for the MIH_Go_Online Request message.

The MIH_Go_Online Response message is used by the MIHF to acknowledge the end of suspension. This message reports a success or a failure.

The parameter ResumeResultCode uses the parameter type Status with the TLV 245. The type value 245 is used as specified for common TLV encodings.

Beside this common TLV encoding an extended common TLV encoding is proposed. The new proposed common TLV field and the associated type code is type 244 for the parameter name Time Interval 2.

This Time Interval 2 parameter specifies the duration of time in seconds. The type is 244, the length is 2 and the value corresponds to the time interval in seconds.

Further an extended other TLV Field is proposed and an associated type code is proposed. The type is 26 and the parameter name is Suspend Reason Code.

The parameter Suspend Reason Code specifies the reasons for suspension of MIH communication. The type is 26, for example the length field corresponds to the value of 1 and the value is the reason for why requesting the suspension of MIH communication. Even if for this example a length field value of 1 is assumed, any other value may be used as appropriate.

E.g. a value of 0 indicates the reason SRC_JOIN_MOVING_NETWORK, indicating that the user equipment is joining a moving network.

FIG. 17 shows a block diagram of an apparatus according to an exemplary embodiment of the present invention.

The apparatus for temporarily suspending a network connection 1700 comprises a sending device 1701. The sending device is connected to the receiving device MIH_SAP. Between sending device 1701 and receiving device MIH_SAP MICS commands are exchanged.

The receiving device MIH_SAP is part of the MIHF device 1702. The MIHF device 1702 further comprises the confirmation device 1703, the suspend command detecting device 1704 and the resume command detecting device 1705. The confirmation device 1703, the suspend command detecting device 1704 and the resume command detecting device 1705 are connected to the receiving device MIH_SAP.

Furthermore, the suspension device 1706 and the resume device 1707 are connected to the MIHF device (1702).

For detecting a trigger event, on the apparatus 1700 the trigger device 1708 exists, which is connected to the sending device 1701.

For determining a time duration, e.g. for determining the expiry of the validity of context information, a timer 1709 exists on the apparatus 1700.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A method, comprising:
    receiving a suspend command in a Media Independent Handover Function, the suspend command relating to a network connection that is using the Media Independent Handover Function;
    detecting the suspend command in the Media Independent Handover Function; and
    suspending the network connection temporarily in response to the detecting,
    wherein the network connection is a Media Independent Handover connection.

2. The method of claim 1, the Media Independent Handover Function further comprising:
    a local Media Independent Handover Function; and
    a remote Media Independent Handover Function,
    wherein the local Media Independent Handover Function and the remote Media Independent Handover Function have a communication relationship.

3. The method of claim 1, wherein suspending the network connection comprises storing a context of the network connection for a predetermined time or time interval.

4. The method of claim 1 further comprising:
    detecting a trigger event for suspending the network connection; and
    initiating sending the suspend command, when the trigger event is detected.

5. The method of claim 4, wherein the trigger event for suspending the network connection is joining a mobile network.

6. The method of claim 1 further comprising:
    suspending the network connection for a predetermined time duration.

7. The method of claim 6, further comprising:
    deleting the stored context, if the connection is not resumed within the predetermined time duration.

8. The method of claim 1 further comprising:
    receiving a resume command in the Media Independent Handover Function;
    detecting the resume command in the Media Independent Handover Function;
    resuming the suspended network connection.

9. The method of claim 8, wherein resuming the suspended network connection comprises loading a context of the suspended network connection.

10. The method of claim 8, further comprising:
    detecting a trigger event for resuming the suspended network connection.

11. The method of claim 10, wherein the trigger event for resuming the suspended network connection is leaving a mobile network.

12. A non-transitory computer readable medium comprising a computer program product, which, when being executed by a processor, is configured to carry out a method, the method comprising:
    receiving a suspend command in a Media Independent Handover Function, the suspend command relating to a network connection that is using the Media Independent Handover Function;
    detecting the suspend command in the Media Independent Handover Function; and
    suspending the network connection temporarily in response to the detecting,
    wherein the network connection is a Media Independent Handover connection.

13. An apparatus, comprising:
    a Media Independent Handover Function device;
    the Media Independent Handover Function device comprising:
    a receiving device;
    a suspend command detecting device connected to the receiving device;
    a suspension device connected to the Media Independent Handover Function device;
    wherein the receiving device is configured to receive a suspend command relating to a network connection that is using a Media Independent Handover Function;
    wherein the suspend command detecting device is configured to detect the suspend command as a suspend command;
    wherein the suspension device is configured to suspend the network connection temporarily, if a suspend command is received;
    wherein the network connection is a Media Independent Handover connection.

14. The apparatus of claim 13, the Media Independent Handover Function device comprising:
    a local Media Independent Handover Function device; and
    a remote Media Independent Handover Function device;
    wherein the local Media Independent Handover Function device and the remote Media Independent Handover Function device have a communication relationship,
    wherein the local Media Independent Handover Function device and the remote Media Independent Handover Function device are located on different apparatus.

15. The apparatus of claim 13, wherein the suspension device is configured to store a context of the network connection.

16. The apparatus of claim 13 further comprising:
    a trigger device,
    wherein the trigger device is configured to detect a trigger event for suspending the network connection.

17. The apparatus of claim 16, wherein the trigger device is configured to detect joining a mobile network.

18. The apparatus of claim 13 further comprising:
    a timer device,
    wherein the timer device is configured to suspend the network connection for a predetermined time duration.

19. The apparatus of claim 13, the Media Independent Handover Function device further comprising:
    a resume command detecting device, connected to the receiving device;
    the apparatus further comprising:
    a resume device, connected to the Media Independent Handover Function device,
    wherein the receiving device is configured to receive a resume command,
    wherein the resume command detecting device is configured to detect the resume command as a resume command, and
    wherein the resume device is configured to resume the suspended network connection.

20. The apparatus of claim 16, wherein the trigger device is configured to detect a trigger event for resuming the suspended network connection.

21. The apparatus of claim 16, wherein the trigger device is configured to detect leaving a mobile network.

22. The apparatus of claim 13, wherein the apparatus is one of a mobile device or a network node of a telecommunication network.

* * * * *